United States Patent
Yoda et al.

(10) Patent No.: US 7,680,295 B2
(45) Date of Patent: Mar. 16, 2010

(54) HAND-GESTURE BASED INTERFACE APPARATUS

(75) Inventors: Ikushi Yoda, Tsukuba (JP); Katsuhiko Sakaue, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 1045 days.

(21) Appl. No.: 10/489,301

(22) PCT Filed: Sep. 17, 2002

(86) PCT No.: PCT/JP02/09496

§ 371 (c)(1),
(2), (4) Date: Aug. 16, 2004

(87) PCT Pub. No.: WO03/025859

PCT Pub. Date: Mar. 27, 2003

(65) Prior Publication Data

US 2006/0182346 A1    Aug. 17, 2006

(30) Foreign Application Priority Data

Sep. 17, 2001    (JP) .............................. 2001-282076

(51) Int. Cl.
*G06K 9/00* (2006.01)
*G06K 9/46* (2006.01)

(52) U.S. Cl. ..................... 382/100; 382/103; 382/115; 382/154; 382/190

(58) Field of Classification Search ........................ None
See application file for complete search history.

(56) References Cited

U.S. PATENT DOCUMENTS

| 4,119,900 A | * | 10/1978 | Kremnitz ...................... 701/23 |
| 4,183,013 A | * | 1/1980 | Agrawala et al. ........... 382/173 |
| 5,012,522 A | * | 4/1991 | Lambert ...................... 382/118 |

(Continued)

FOREIGN PATENT DOCUMENTS

EP     919906     6/1999

(Continued)

OTHER PUBLICATIONS

U.S. Appl. No. 10/540,127, filed Jun. 20, 2005, Yoda, et al.

*Primary Examiner*—Bhavesh M Mehta
*Assistant Examiner*—Gandhi Thirugnanam
(74) *Attorney, Agent, or Firm*—Oblon, Spivak, McClelland, Maier & Neustadt, L.L.P.

(57) ABSTRACT

An interface is provided that corresponds to an individual person without being restricted to a particular place within a room, by performing gesture recognition while identifying an individual person. A stereo camera (1) picks up an image of a user (4), and based on the image pickup output, an image processor 2 transmits a color image within a visual field and a distance image to an information integrated recognition device (3). The information integrated recognition device (3) identifies an individual by the face of the user (4), senses the position, and recognizes a significant gesture based on a hand sign of the user (4). The information integrated recognition device (3) executes a command corresponding the identified user (4) and performs operations of all devices (6) to be operated in the room (such as a TV set, an air conditioner, an electric fan, illumination, acoustic condition, and window opening/closing).

4 Claims, 9 Drawing Sheets

U.S. PATENT DOCUMENTS

| | | | |
|---|---|---|---|
| 6,116,907 A * | 9/2000 | Baker et al. | 434/156 |
| 6,215,890 B1 * | 4/2001 | Matsuo et al. | 382/103 |
| 6,421,453 B1 * | 7/2002 | Kanevsky et al. | 382/115 |
| 6,788,809 B1 * | 9/2004 | Grzeszczuk et al. | 382/154 |
| 6,904,182 B1 * | 6/2005 | Simard et al. | 382/284 |
| 2002/0036617 A1 * | 3/2002 | Pryor | 345/156 |
| 2002/0181773 A1 * | 12/2002 | Higaki et al. | 382/190 |
| 2004/0028260 A1 * | 2/2004 | Higaki et al. | 382/118 |

FOREIGN PATENT DOCUMENTS

| | | |
|---|---|---|
| JP | 2000-216 | 1/2000 |
| JP | 2002-251235 | 9/2002 |

\* cited by examiner

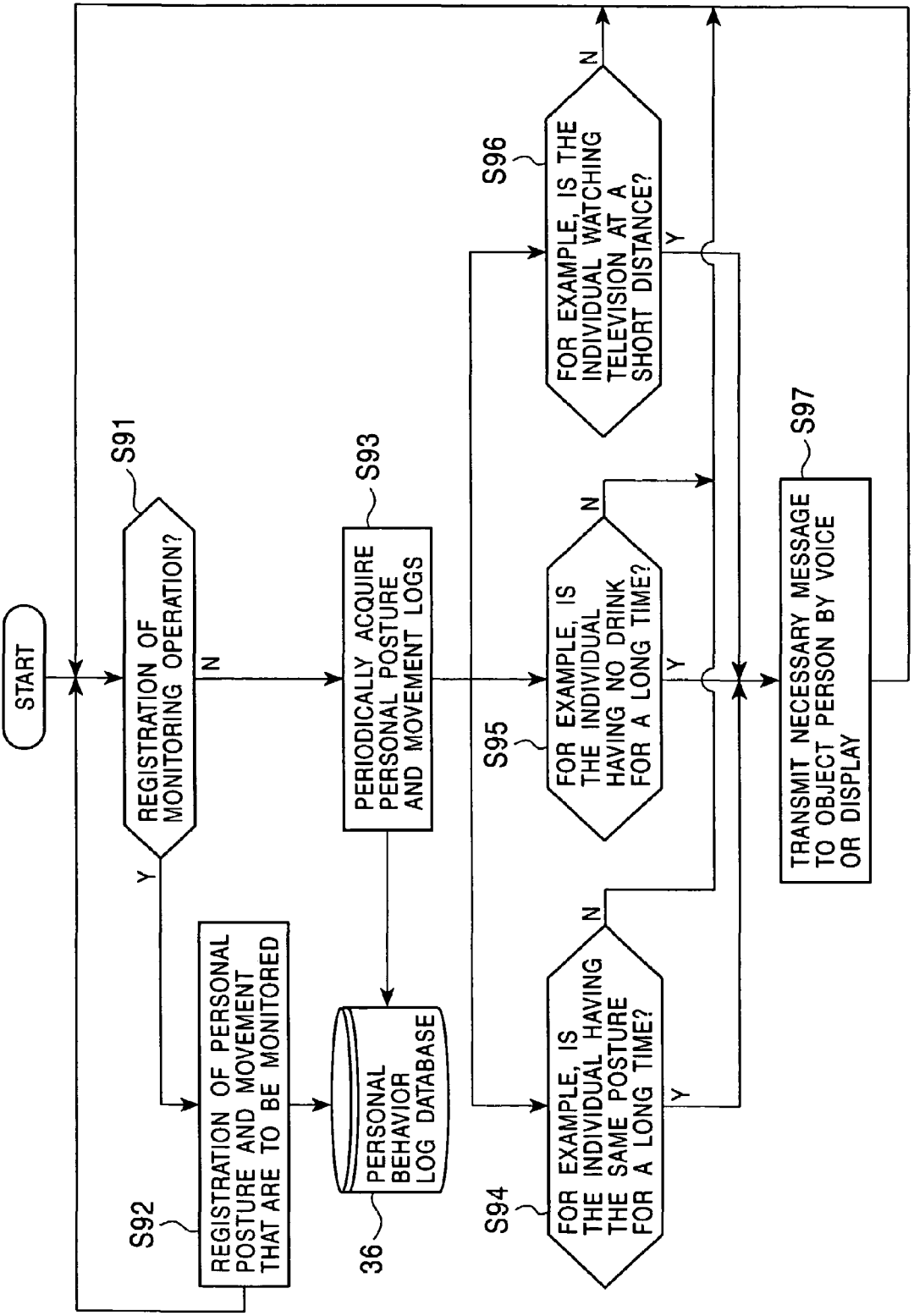

HAND-GESTURE BASED INTERFACE APPARATUS

TECHNICAL FIELD

The present invention relates to an interface, and more specifically, to a hand-gesture based interface in an indoor space, the interface having a function of identifying an individual person by face and stature.

BACKGROUND ART

There are a large number of systems as shown in FIG. 1, i.e., systems for identifying a speaker or the like based on a position and direction of the face of an individual person. This type of system finds the face of a user 64 based on color information or the like of images picked up by one or a few cameras 61, and performs personal identification by face, or measures the direction of the face, the direction of sight line or the like, with the help of eyes, nose, mouth or the like, which are structures in the face.

Therefore, persons who are within a recognition object region 63 would be substantially limited to users sitting and persons watching a space such as a particular display 62. This raises a problem in that this type of system can be used only in very narrow places. Also, regarding the identification of behavior of the user that is performed in conjunction with the personal identification, the direction of face, that of sight line, and nodding action form the nucleus of objects to be identified.

Also, in conventional systems as shown in FIG. 2, i.e., systems for specifying three-dimensional positions and movements of a person in an indoor space 5, the whole body of a user 72 is photographed by arranging cameras 71 (71-1, 71-2, 71-3, 71-n) to expand the object region. However, this type of system does not constitute a gesture-based interface apparatus associated with personal identification, and therefore, it would not provide interaction specified for each user.

Furthermore, conventional recognition systems as shown in FIG. 3, i.e., systems for recognizing a hand sign of a user 84 is used as an interface apparatus by acquiring an image of a hand alone by a display device 82 or the like in a fixed environment in front of a camera 81, that is, in a recognizable region 83, to thereby recognize the hand sign. This causes a problem in that this type of system is operable only in narrower and fixed environments. Therefore, this type of system would not provide a hand-sign based interface for each individual person, the interface having the function of identifying an individual and acquiring a movement/behavior log of the individual in a wide space such as a room.

DISCLOSURE OF INVENTION

Accordingly, it is an object of the present invention to provide a gesture interface apparatus capable of facilitating the personal identification of a plurality of persons in an indoor space, the acquisition of all their behavior logs, and the hand-sign based operation of the indoor space corresponding to an individual person.

While identifying persons in an indoor space by face and stature, the present invention specifies the positions of respective persons in the room. Simultaneously, by directly pointing the device to be operated and indicating a hand sign, a command for operating the indoor device is issued. When a registered article in the indoor space is changed, the change is recorded. Also, all behavior of all persons who behave in the room is recorded.

Furthermore, the present invention provides means for registering a face and hand sign in correspondence with an individual person, and articles in the room. Also, the present invention provides storage means for storing a command corresponding to a hand sign movement in accordance with an individual person, and simultaneously means for registering commands corresponding to respective devices to be operated.

Moreover, in the present invention, means for previously registering movement contents for each individual person that are to be supposed to be observed, and these contents are notified of by a voice synthesizer or a display.

BRIEF DESCRIPTION OF THE DRAWINGS

FIG. 9 is a flowchart of personal monitoring, which is an operation according to the embodiment of the present invention.

DETAILED DESCRIPTION

Figure 1:
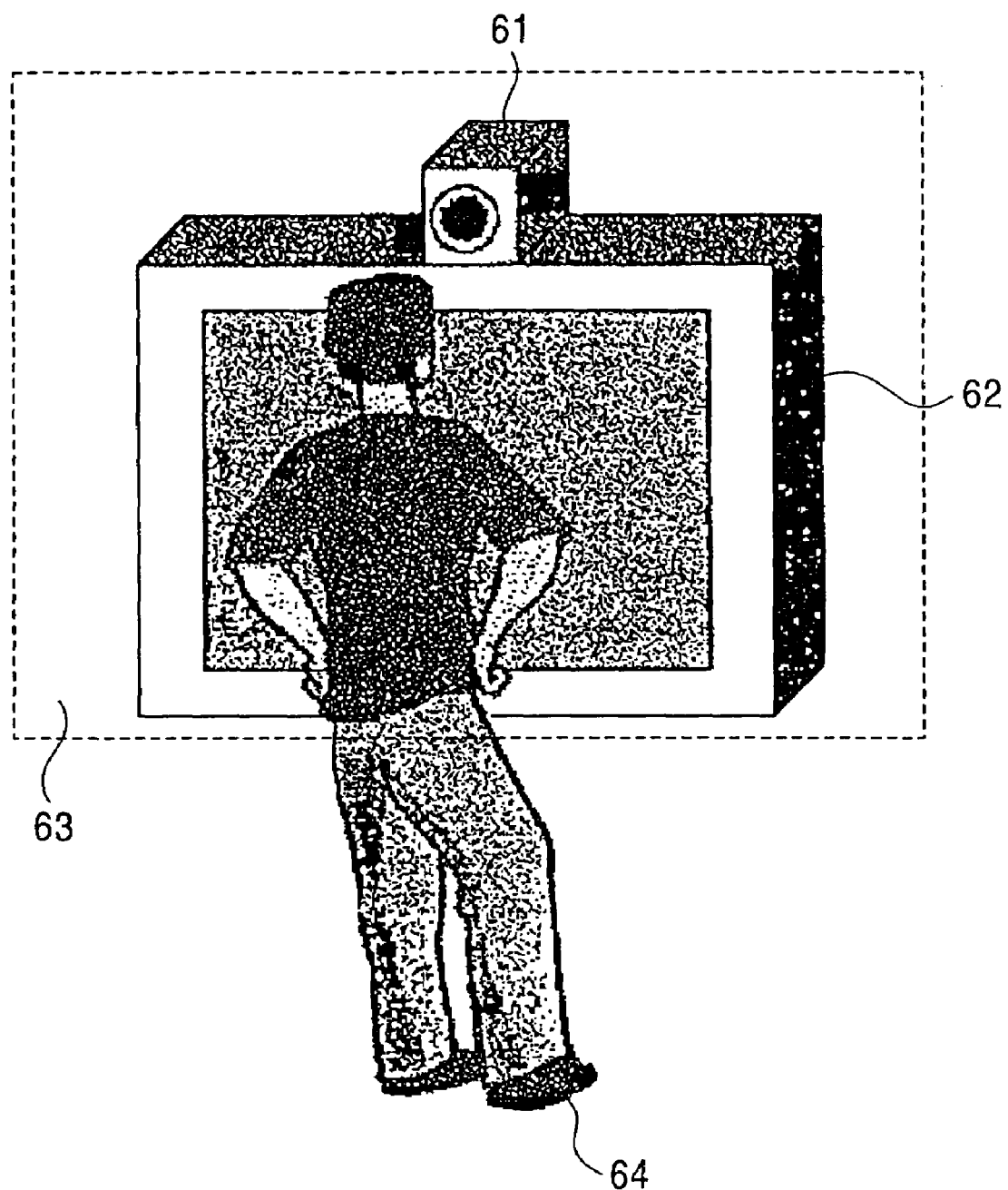
FIG. 1 is a representation showing a conventional art.
Figure 2:
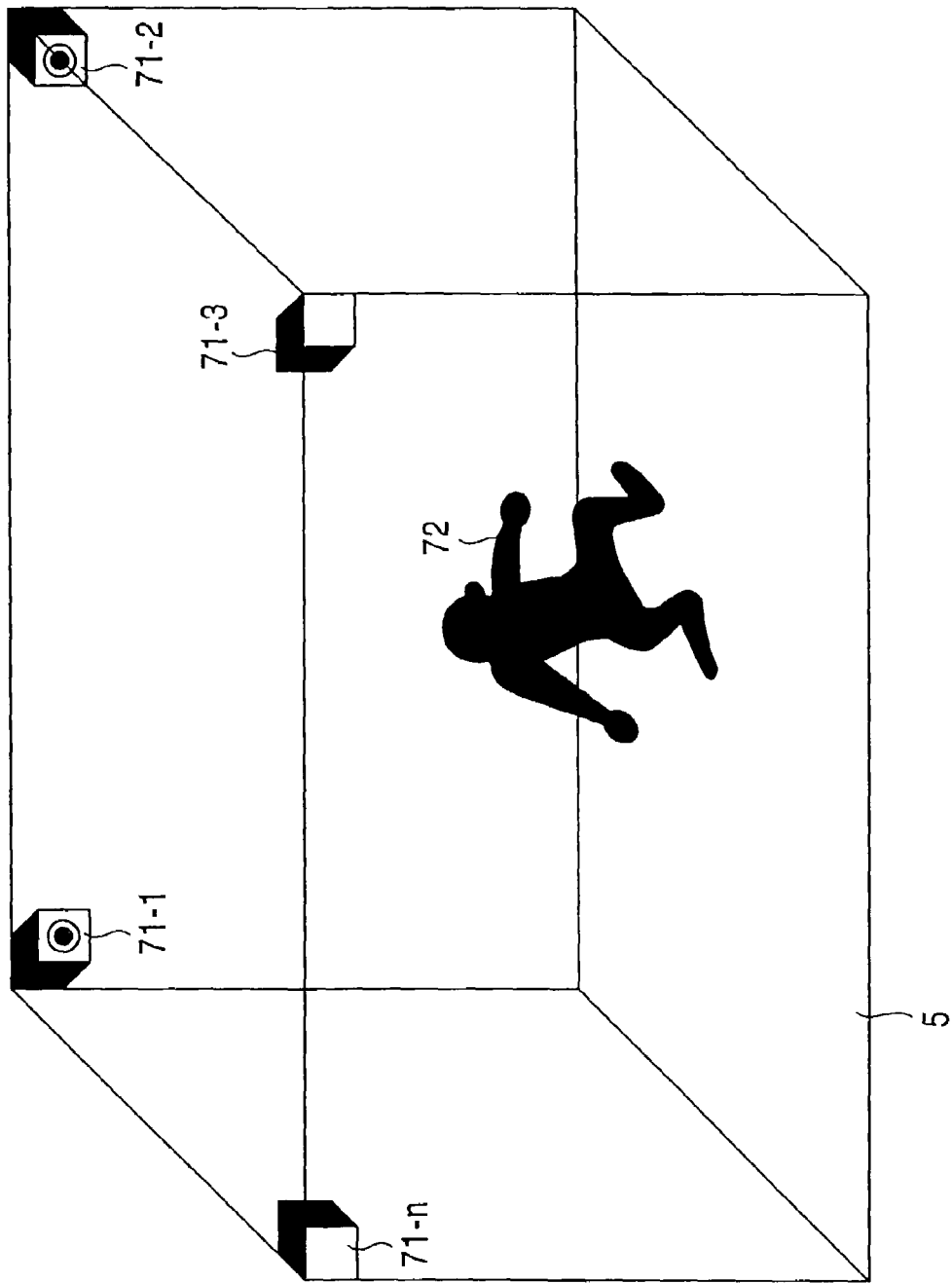
FIG. 2 is another representation showing a conventional art.
Figure 3:
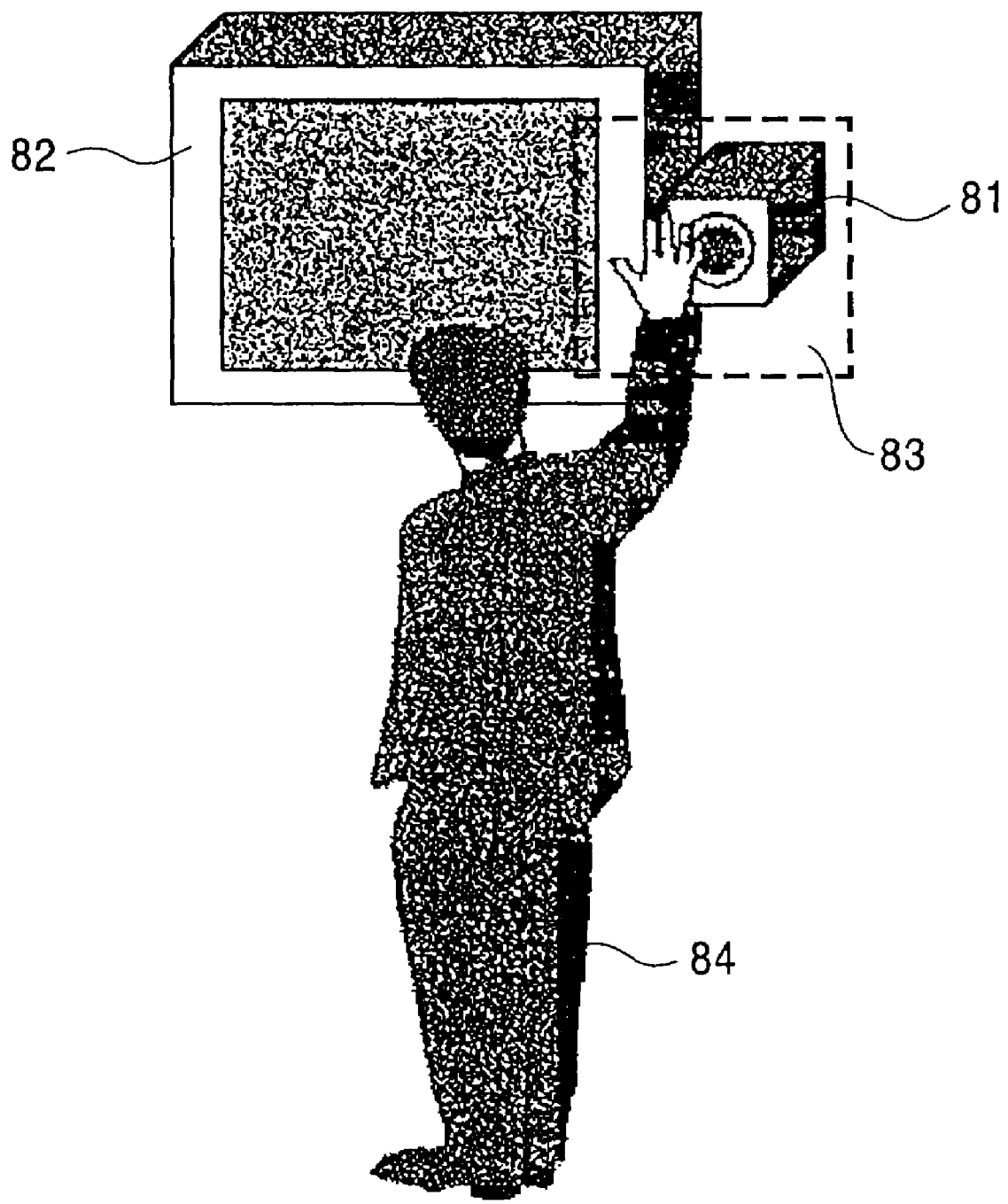
FIG. 3 is still another representation showing a conventional art.
Figure 4:
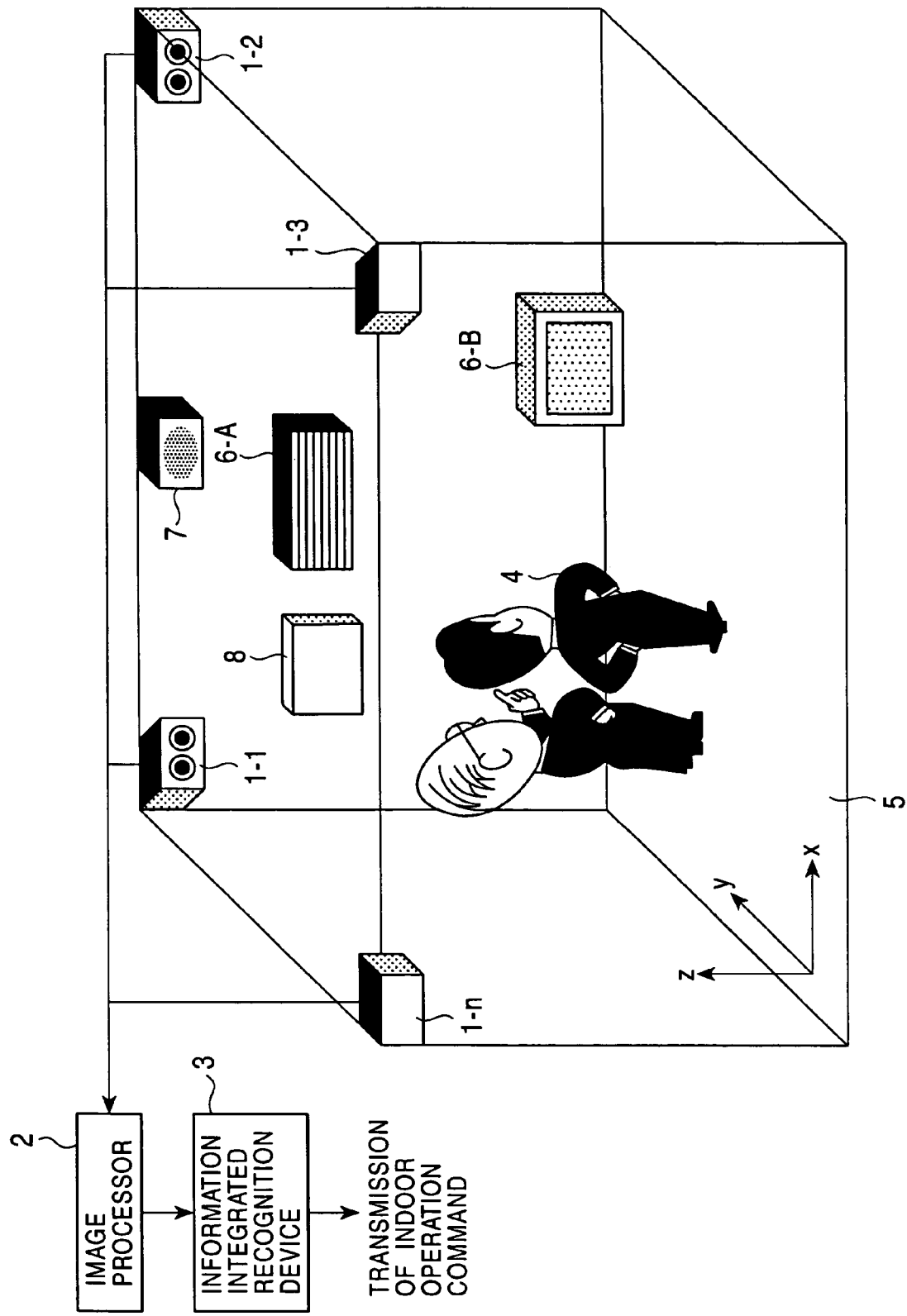
FIG. 4 is a representation showing the configuration of a system according to an embodiment of the present invention.
Figure 5:
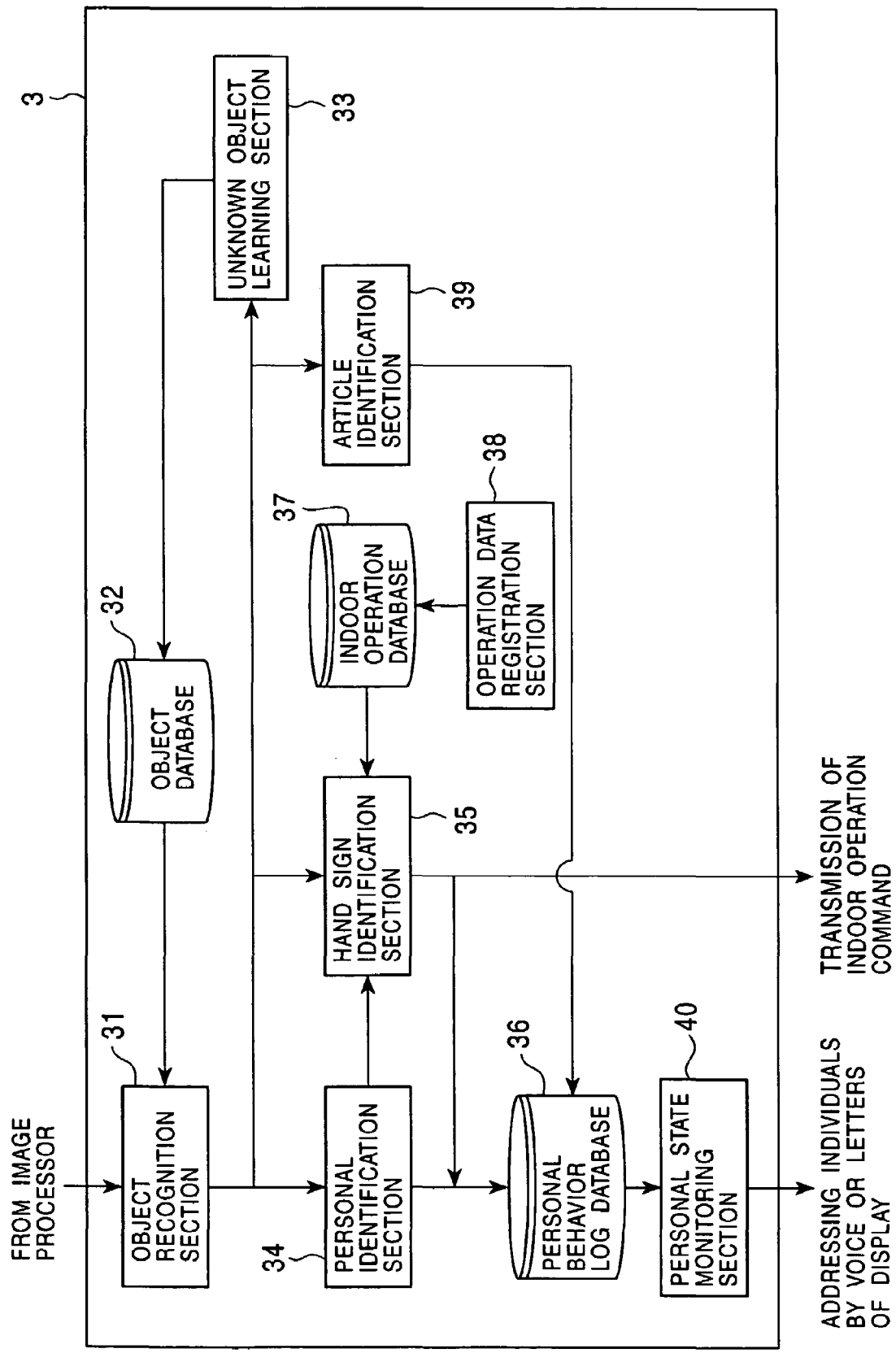
FIG. 5 is a block diagram of the information integrated recognition device shown in FIG. 4.

FIG. 4 is a representation showing the configuration of a system according to an embodiment of the present invention, and FIG. 5 is a block diagram of the information integrated recognition device shown in FIG. 4.

In FIG. 4, an indoor space 5 is photographed by a plurality of stereo cameras 1-1 to 1-n so as to leave no blind spot, and a user 4 moves in the indoor space 5. Two or more camera image-pickup devices are fixed to each of the stereo cameras 1 in parallel therewith. The image pickup outputs by the stereo cameras 1-1 to 1-n are delivered to an image processor 2. The stereo cameras themselves are of a known type, and a type such as Digiclops produced by PointGrey Research, or Acadia produced by Sarnoff Research Center is used therefor.

The image processor 2 processes images from the stereo cameras 1 as inputs, at the rate of about 10 to 30 images per second, and delivers the results of color images and distance images obtained to an information integrated recognition device 3. In this manner, the image processor 2 acquires x-, y-, and z-coordinate information and color image information about all objects present in the room, and sends them to the information integrated recognition device 3.

As shown in FIG. 5, the information integrated recognition device 3 includes an object recognition section 31, object database 32, unknown object learning section 33, personal identification section 34, hand sign identification section 35, personal behavior log database 36, indoor operation database 37, operation data registration section 38, article identification section 39, and personal state monitoring section 40. The object recognition section 31 clips a plurality of portions constituting an object in a color image, based on three-dimensional information delivered from the image processor 2, and performs recognition processing with respect to all of the plurality of portions. The object database 32 stores all object data that has been learned thereby in advance. The unknown object learning section 33 learns unknown objects, and stores the learned results in the object database 32. The personal identification section 34 identifies an individual person based on the head portion and stature of the recognized object, and records all behavior of the individual, such as movements and postures in a room, in the personal behavior log database 36. In cooperation with the personal identification section 34, the hand sign identification section 35 issues an indoor operation command registered in the indoor operation database 37 when an intended hand sign is indicated, and concurrently, the hand sign identification section 35 registers the log thereof in the personal behavior log database 36. The operation data registration section 38 registers information about an indoor operation object device 6 and information about a person capable of operation, in the indoor operation database 37. The article identification section 39 recognizes another matter than the head and hand portions of the user, that is, an article. When an article moves or is newly brought in, the relationship between the person who has brought about the change regarding the article and the article is registered in the personal behavior log database 36. The personal state monitoring section 40 previously registers, in the personal behavior log database 36, behavior for each individual person, the behavior being to be supposed to be monitored. When a condition in question is found in the database that is updated in succession, the personal state monitoring section 40 notifies the user 4 of it by a voice synthesizer 7 or by displaying it on a display device 8.

Figure 6:
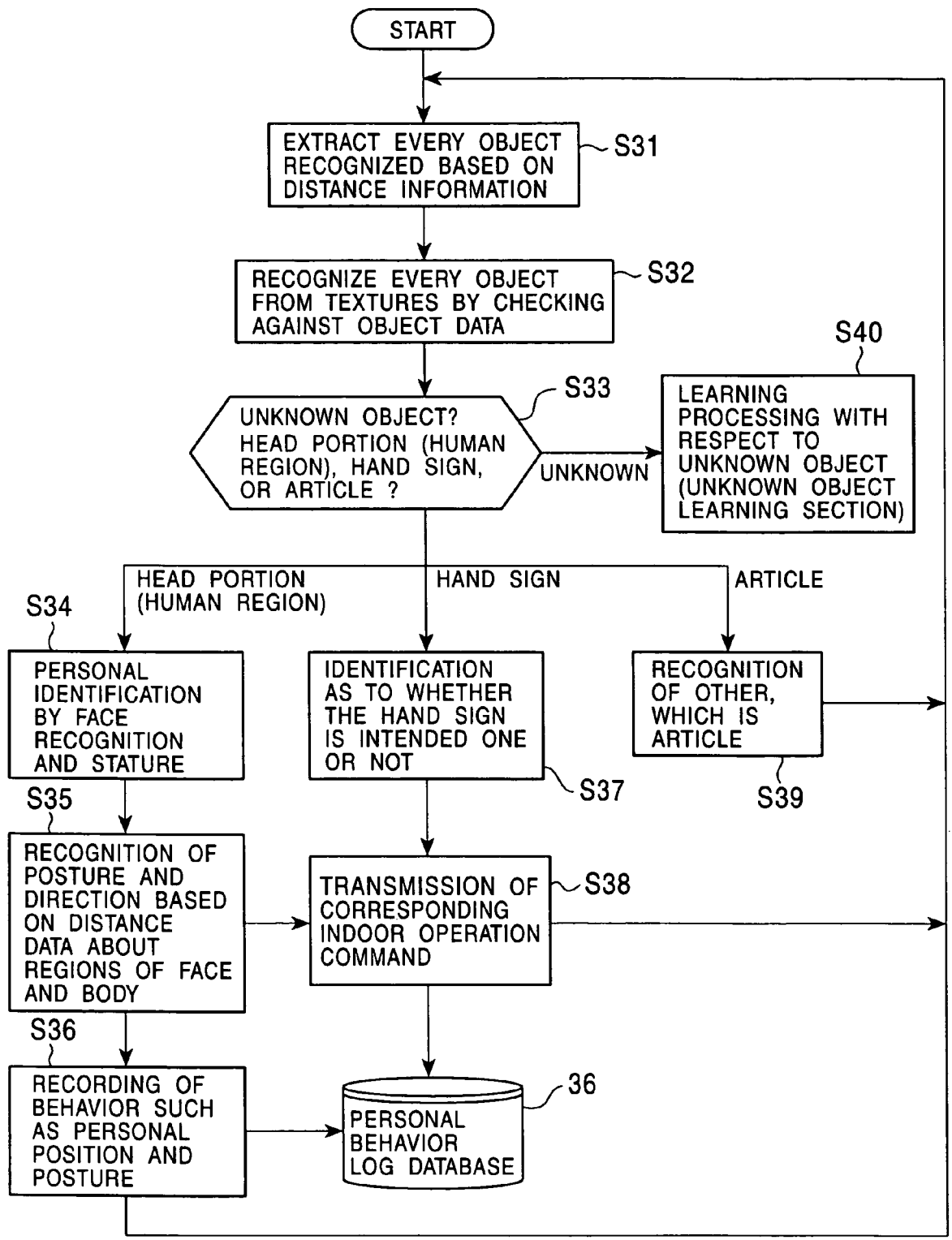
FIG. 6 is a flowchart for explaining operations according to the embodiment of the present invention.

FIG. 6 is a flowchart for explaining operations according to the embodiment of the present invention, and it provides a partially detailed explanation of FIG. 5. While FIGS. 4 to 6 show the interface apparatus in a room according to the embodiment of the present invention, the present invention is not limited to this embodiment. For example, the present invention can also be applied to keeping track of personal states for safety management by replacing the indoor space by a factory or a public space. All users 4 who go in and out of the indoor space 5 shown in FIG. 5 are photographed by the cameras 1-1 to 1-$n$, and the image pickup outputs are delivered to the image processor 2. More specifically, persons who go in and out of this space are photographed regarding all their behavior until the persons go out of the room, and the behavior is recorded in accordance with the processing flow in FIG. 6.

The image processor 2 produces an image within a visual field and distance information based on a coordinate system of the room for each camera, and delivers them to the information integrated recognition device 3. The coordinate system x, y, and z (FIG. 4) common to all stereo cameras (1-1 to 1-$n$) is preset.

In step S31 (the object recognition section 31 in FIG. 5), a region of an object to be recognized is extracted based on distance information (x, y, z) from the stereo cameras (1-1 to 1-$n$). Regarding an object projecting from the floor surface and unfixed in the room within the visual field of each of the cameras, for example, a person, an extraction is sequentially performed from the top side thereof in a size on the order of 64×64 pixels, and the extracted result is determined as a recognition object. In particular, the face becomes a recognition object from a plurality of directions.

In step S32 (the object recognition section 31 in FIG. 5), all objects that have been extracted in step S31 are recognized by being checked against all object databases 32 in which all objects have been registered in advance. Here, the recognition results are outputted with a definite degree of confidence, and objects each having a threshold value that is not more than a definite value is recognized as unknown objects. First, objects are broadly classified into categories of head portions, hands, and others, which are articles. In particular, regarding the head portions, recognition results from a plurality of directions are obtained.

Based on the recognition results, in step S33 (the object recognition section 31 in FIG. 5), the recognition results are classified into the cases of head portions, hand signs, and others, which are articles, and the case of unknown objects. Herein, processing are performed for each object.

When head portions have been identified, in step S34 (the personal identification section 34 in FIG. 5), the personal identification is performed based on the recognition results of the plurality head portions and the statures of the respective pertinent persons, thereby enhancing the recognition accuracy. In step S35 (the personal identification section 34 in FIG. 5), in relation with regions of face and body, a posture of the pertinent person (i.e., a standing posture or sitting posture, and a direction toward which the person is facing) and a position of the person are recognized. Then, in step S36 (the personal identification section 34 in FIG. 5), changing states of the person are recorded in the personal behavior log database 36.

When a hand sign has been identified, in step S37 (the hand sign identification section 35 in FIG. 5), it is identified whether the hand sign is an intended hand sign, based on the direction pointed then by the hand, the direction of face and/or body, and the kind and movement of the sign. Then, in step S38 (the hand sign identification section 35 in FIG. 5), after having been integrated with the result of the personal identification simultaneously performed, a command for an indoor operation is issued, the command being permitted for the pertinent person. According to the example shown in FIG. 4, a TV set and air conditioner, which are objects 6 to be operated, are each operated only by a hand sign and its movement, in accordance with a command transmitting method that has been registered in advance. The transmission history of commands is stored also in the personal behavior log database 36.

When an article has been identified, in step S39 (the article identification section 39 in FIG. 5), information as to who held the article and how it was moved, and information about the ultimate destination of the article is stored also in the personal behavior log database 36.

Figure 7:
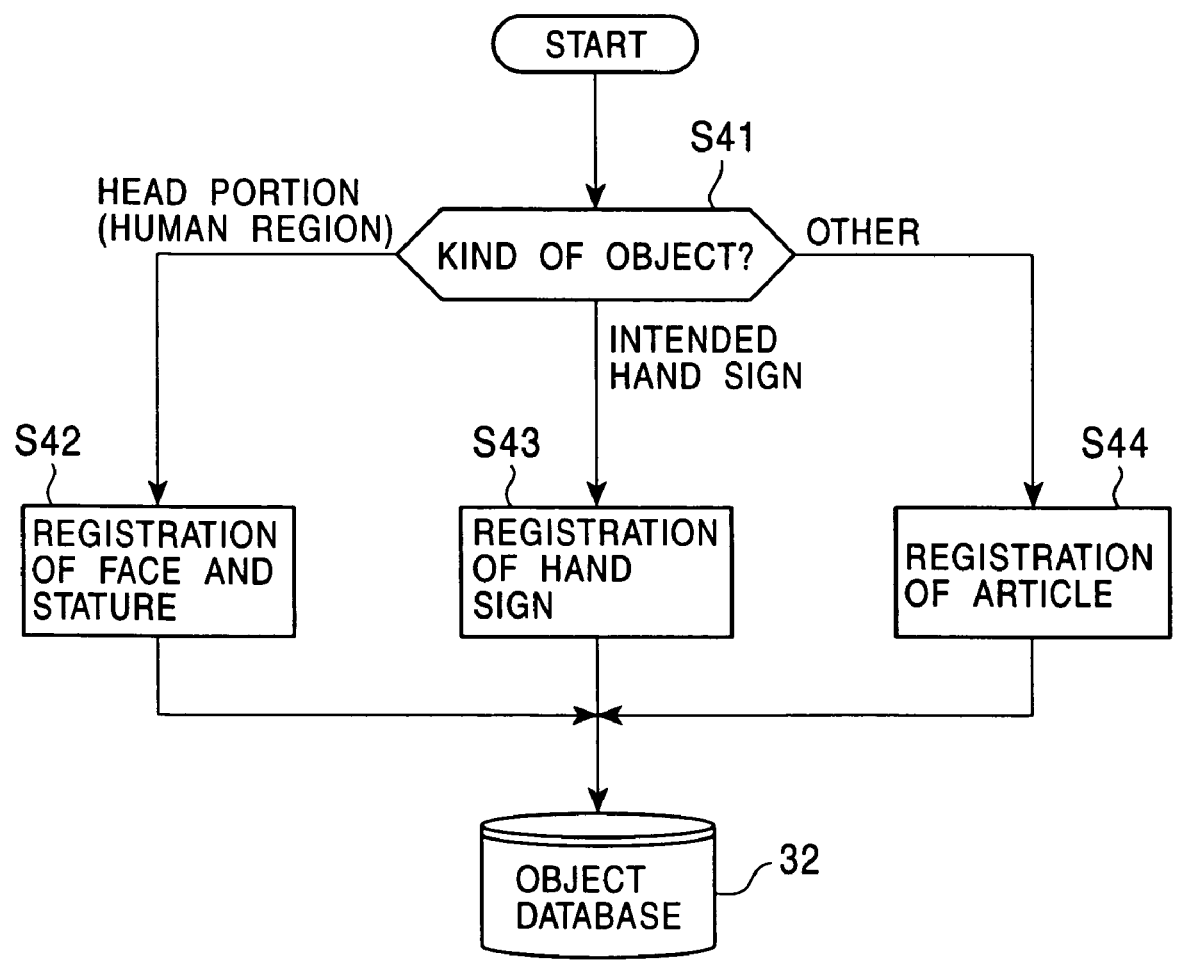
FIG. 7 is flowchart of learning processing with respect to an unknown object, the learning processing being an operation according to the embodiment of the present invention.

Next, learning processing with respect to unknown objects in step S40 will be described. Its details correspond to the unknown object learning section 33 shown in FIG. 5, and they are illustrated in FIG. 7. Regarding this unknown object learning section, in a normal state, unknown objects are kept as they are. However, if the user wants to newly register the unknown objects, based on the designation by the user, they are registered by category: head portions, hand signs, and others, which are articles, as shown in step S41 (the unknown object learning section 33 in FIG. 5).

Regarding the head portion, in step S42 (the unknown object learning section 33 in FIG. 5), a face image from a plurality of directions and a stature is registered in the object database 32. Also, forms of hand sign are registered in step S43 (the unknown object learning section 33 in FIG. 5), and they are registered in the object database 32, as well. The others, which are articles, are also registered in the object database 32 in step S43 (the unknown object learning section 33 in FIG. 5) by pointing with the article held in hand or by designating the object.

Figure 8:
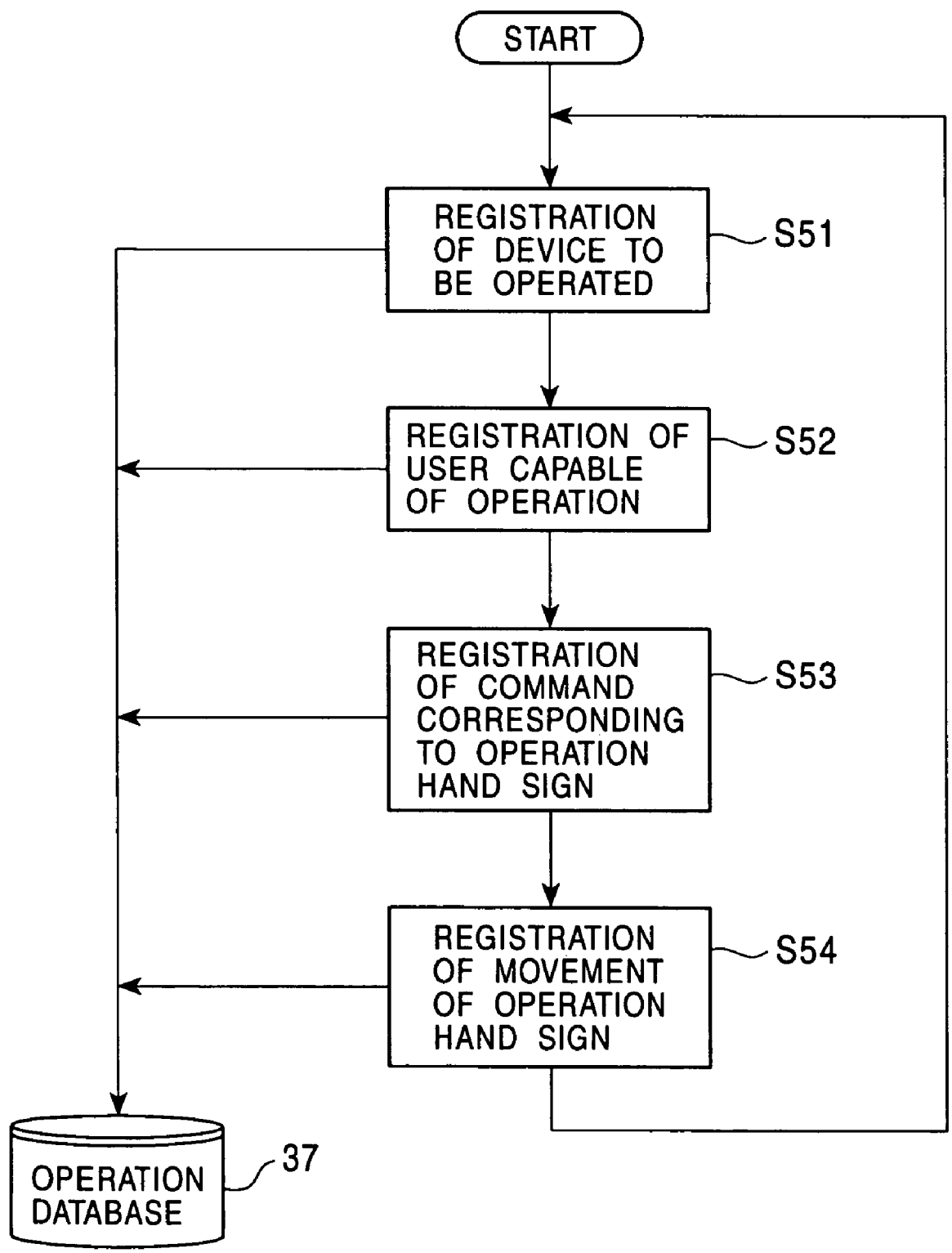
FIG. 8 is a registration processing flowchart of an operation database of indoor operation objects, the registration processing being an operation according to the embodiment of the present invention.

In FIG. 8, operation database for indoor operation objects is registered. This processing corresponds to the operation data registration section 38 shown in FIG. 5. Specifically, regarding a TV set, air conditioner or the like corresponding to an object device to be operated, the device to be operated and its position in the indoor space are first registered in step 51 (the operation data registration section 38 in FIG. 5). The purpose of registering its spatial position is to realize an intuitive operation by pointing the actual article when attempting to operate it. Then, a user capable of operating this device is registered in step 52 (the operation data registration section 38 in FIG. 5). Moreover, the registration for relating a hand sign for performing an operation for each user to a command is performed in step 53 (the operation data registration section 38 in FIG. 5). The operable command can be designated in detail for each user. Then, in step 54 (the operation data registration section 38 in FIG. 5), the way to move hand when attempting to perform an operation can be designated. This series of processing is repeated for each object to be operated. Also, when a new user is added, the registration of the user is similarly repeated.

FIG. 9 is a detailed illustration of the personal state monitoring section 40 shown in FIG. 5. When attempting to register a personal state to be observed, the contents thereof are registered in the personal behavior log database 36 in advance, after having undergone step 91 (the personal state monitoring section 40 in FIG. 5). The specific contents are compared in the personal behavior log database 36 sequentially updated, by step 93 (the personal state monitoring section 40 in FIG. 5). During an ordinary operation, like the examples shown, e.g., in steps 94 to 96 (the personal state monitoring section 40 in FIG. 5), the above-described contents can be used for sending to an individual a message, e.g., to prevent having the same posture for a long time, to appropriately promote water supplies, or to prevent excessively watching television at a short distance, whereby the contents can serve for health promotion (the prevention of the occurrence of blood clots, shoulder stiffness, lower back pain or the like by improving blood circulation and water supplies, and the prevention of decreased visual acuity by keeping an appropriate distance between the television and an individual). These messages are given to each individual by the voice synthesizer 7 or by a display on the display device 8 in step S97 (the personal state monitoring section 40 in FIG. 5).

As describe above, according to the present invention, it is possible to photograph the room by a plurality of stereo cameras, to acquire all behavior logs of persons who are present in the room, and to issue an operation command to an object to be operated in a room by an intended hand sign, the object having been registered in advance.

With these arrangements, the present invention has the function of previously registering persons and articles that are present in the room and can impose limitations on an operation for each person, and therefore, the present invention is capable of setting regarding the capability or incapability of operation for each person. This makes it possible to provide interfaces that vary from a user to another, including an interface that an adult can operate but that a child cannot operate.

Furthermore, by clipping objects comprising a person sequentially from the top side thereof, the objects can be correctly recognized, without being influenced by states thereof (such as postures).

Regarding personal identification, by registering not only a face but also a stature, it is possible to improve personal identification capability of the present interface.

Moreover, the personal behavior log data, which can be obtained in the room at all times, is always compared with a state observation condition set by the user. This personal behavior log data can be used for health promotion or the like by indicating through the use of voice or a screen display, that an individual is having the same posture for a long time, the distance at which a user is watching television, or the like.

INDUSTRIAL APPLICABILITY

The interface apparatus according to the present invention is particularly suitable for a gesture interface apparatus, recording apparatus, or monitoring apparatus capable of facilitating the personal identification of a plurality of persons in an indoor space, the acquisition of all their behavior logs, and the hand-sign based operation in the indoor space corresponding to an individual person.

The invention claimed is:

1. An interface apparatus, comprising:
   an image processor configured to pick up an image of a room in an indoor space by a plurality of stereo cameras, and to produce a picked up image within a visual field and a distance image based on an indoor coordinate system for each of the stereo cameras;
   a registration section configured to register an indoor object device and a position of the indoor object device in the indoor space;
   an object recognition section configured to extract recognition objects from the picked up image based on distance information from each of the stereo cameras, and to classify the extracted recognition objects, corresponding to a person, into a head portion and a hand sign pointed by the person in the indoor space;
   a personal identification section configured to identify the person based on the recognition result of the head portion and a stature of the person; and
   a hand sign identification section configured to issue a command for an indoor operation to operate the indoor object device corresponding to an object to be operated, based on a direction of the hand sign pointed by the person, a kind and movement of the hand sign, and the identity of the person identified by the personal identification section;
   a personal state monitoring section configured to acquire and store logs of all behavior of the person in the indoor space, wherein
   the personal state monitoring section is configured to previously register the behavior to be monitored for each individual person, in a personal behavior log database,
   the object recognition section is configured to note an object sequentially from the top side thereof along the height direction of the indoor space, and to recognize the object by clipping the object sequentially from the top side thereof, and
   the hand sign identification section is configured to utilize the personal behavior logs, corresponding to the registered behavior to be monitored for each individual person, for identification of the hand sign.

2. The interface apparatus according to claim 1, wherein the hand sign identification section is configured to issue commands for an indoor operation to operate the indoor object device corresponding to the object to be operated each based on the hand sign, the command corresponding to the hand sign varying from a previously registered individual person to another.

3. The interface apparatus according to claim 1, further comprising:

the personal state monitoring section further configured to observe postures of an individual person over a period of time while identifying the person, and to provide notification of the observation results by voice or on a display; and an operation data registration section configured to register the behavior, to be observed, of the person.

4. The interface apparatus according to claim 1, wherein the hand sign identification section is further configured to issue the command for the indoor operation to operate the indoor object device corresponding to an object to be operated based on whether the person is permitted to issue the command.

* * * * *